United States Patent [19]
Fini, Jr.

[11] 3,991,652
[45] Nov. 16, 1976

[54] EDUCATIONAL DEVICE FOR TEACHING NUMERICAL CONTROL

[76] Inventor: Anthony W. Fini, Jr., 4273 Mundy St., Blasdell, N.Y. 14219

[22] Filed: May 2, 1975

[21] Appl. No.: 574,039

[52] U.S. Cl. .......................... 90/13 C; 235/151.11; 318/162; 408/3
[51] Int. Cl.² ...................... B23C 1/16; B23B 39/08
[58] Field of Search .................. 90/13 C; 408/3; 318/162; 235/151.11

[56] References Cited
UNITED STATES PATENTS

| | | | |
|---|---|---|---|
| 3,297,929 | 1/1967 | Gardner et al. | 235/151.11 X |
| 3,624,371 | 11/1971 | Neal | 235/151.11 |
| 3,665,499 | 5/1972 | Cutler | 235/151.11 X |

Primary Examiner—Gil Weidenfeld
Attorney, Agent, or Firm—Bean & Bean

[57] ABSTRACT

An educational device for teaching the principles of numerical control includes a machine tool having three-axis movement with a predetermined fixed rate of movement along each axis. A control tape is driven at a predetermined fixed rate which is faster than the machine rate and contains seven control channels, two for each machine axis and an "off" channel for stopping all movements along each of the three axes. Numerical control programming is effected by punching holes in the relevant tape channels to initiate movements along the axes and terminating such movements by punching holes in the "off" channel. The distances between movement-initiating holes and "off" holes controls machine movement along the axes.

5 Claims, 6 Drawing Figures

EDUCATIONAL DEVICE FOR TEACHING NUMERICAL CONTROL

BACKGROUND OF THE INVENTION

The art of numerical control of machine tools has been very highly developed in recent years because of the many advantages accruing therefrom as compared with conventional methods of machining. Some of the advantages of numerical control are greater accuracy, higher production rates, quality improvement, less set-up time, and less operator skill required.

As is well known, the basis for measuring movements on numerically controlled machine tools is a Cartesian coordinate system consisting of three mutually orthogonal axes passing through a common origin point. Numerical control systems are of two types, the point to point system and the continuous path system. In the point to point system a machine tool has to perform operations at certain points as, for example, the control of a drill press wherein the drill is set into the work as a certain point and to a specified depth point, is then extracted and brought to a different position for a further drilling operation. In the continuous path system, the machining task is continuous and will involve two or three directional movements simultaneously as, for example, in contour milling or lathe work. The point to point system is relatively less complex than the continuous path system wherein inudstrial application necessitates the use of computers to aid in programming the machining operations.

Although persons can be trained in numerical control directly on machines specifically set up for this purpose, such machines and their requisite equipment are extremely complex and expensive, so much so as to be outside the normal reach of many institutions who otherwise are charged with the responsibility of training students for industrial positions.

BRIEF SUMMARY OF THE INVENTION

Accordingly, it is primary concern in connection with this invention to provide a numerical control educational or training device which is relatively simple and inexpensive so as to be available particularly in those institutions where the cost of an actual numerical control system would be prohibitive.

It is another object of this invention to provide an educational device as described above which actually performs machining operations such as milling or drilling which either can be manually controlled or tape controlled and which uses a graph type control tape paper which may be programmed with paper punch holes so as to simplify and teach the basic numerical control concepts associated either with point to point or continuous path systems. The programming and tape preparation can be done by a student without requiring them to have any background in higher mathematics or other disciplines which may be required in connection with conventional numerical control systems. Thus, with a minimum of background and training, a student can grasp the fundamentals required and can easily progress to programming and tape preparation to effect actual machining operation which are identical in principle to those achieved by complex industrial numerical control systems.

BRIEF DESCRIPTION OF THE DRAWING FIGURES

DETAILED DESCRIPTION OF THE INVENTION

Figure 1:
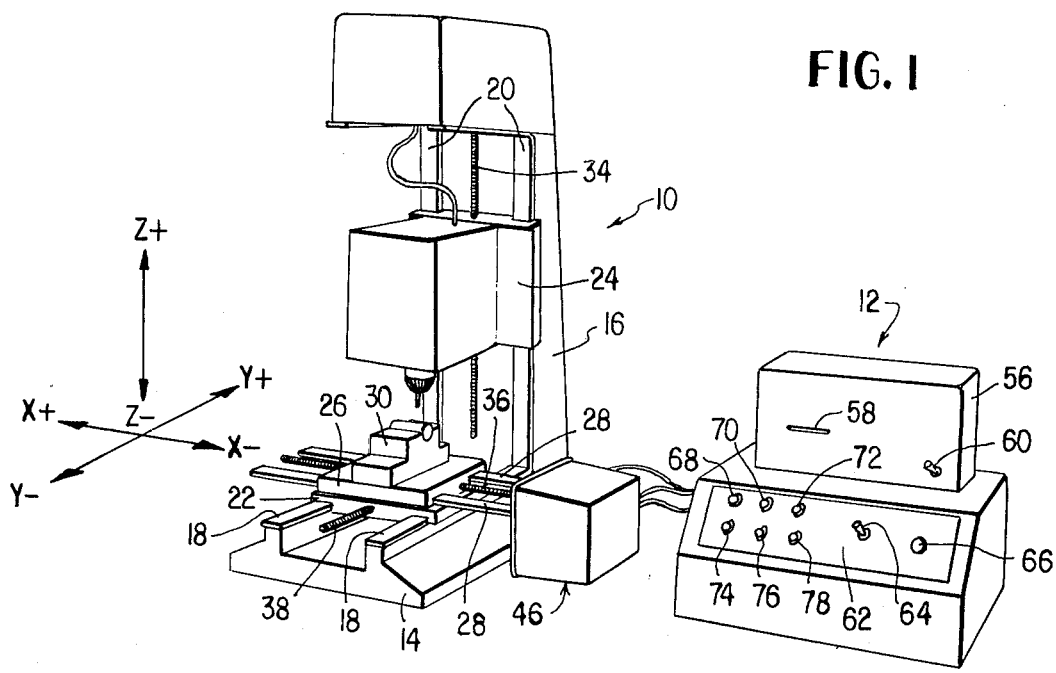
FIG. 1 is a perspective view of a system according to the present invention.
Figure 2:
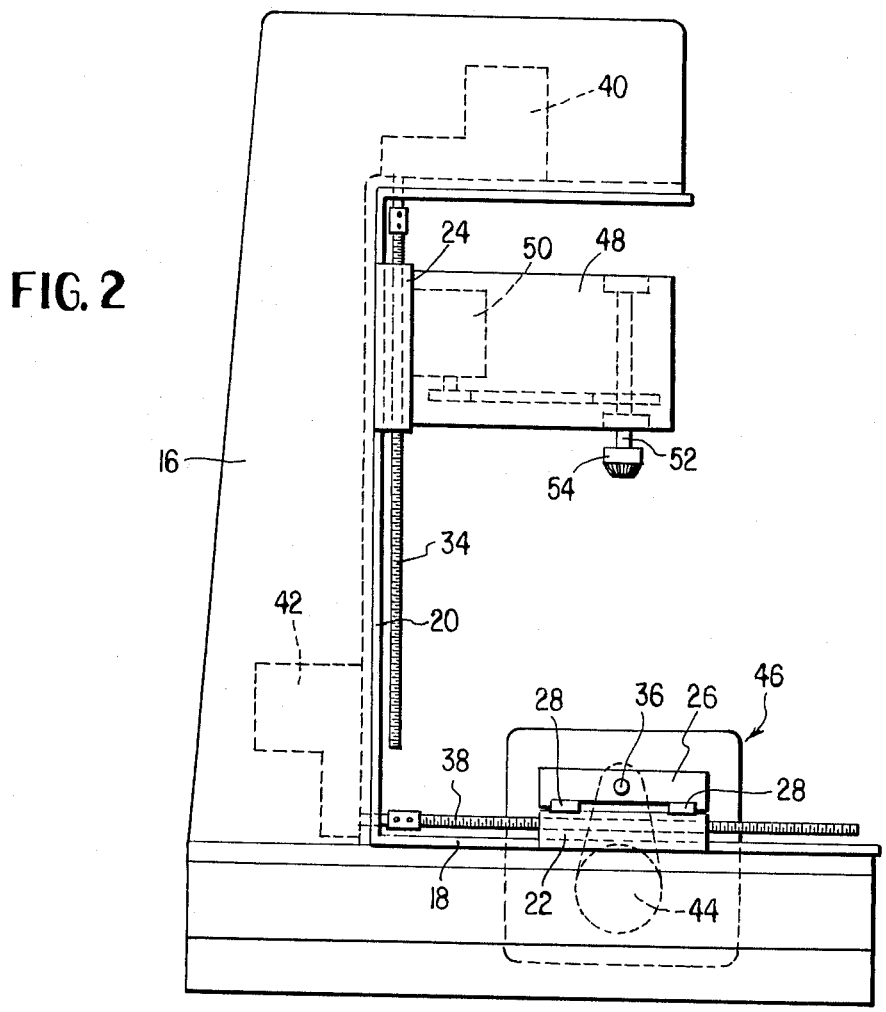
FIG. 2 is a side elevational view of the machine tool.

With reference to FIG. 1, the machine tool is indicated generally by the reference character 10 whereas the control console of this invention is indicated generally by the reference character 12. The machine tool includes a frame including the base 14 and the upright portion 16 which are provided with the respective ways 18 and 20. The ways 18 mount a platform or table 22 for back and forth movements therealong whereas the ways 20 mount the carriage 24 for vertical movements up and down. The table 26 is movable back and forth from side to side along the ways 28 which are fixed to the platform 22. It will be seen that the system of ways provides for back and forth movements of the workpiece holder 30 along two mutually orthogonal axes while the tool carriage 24 is movable up and down along a third and mutually orthogonal axis. Three lead screws 34, 36 and 38 are provided for effecting the relative movements along the three orthogonal axes, the lead screw 34 being driven by a motor and gearbox assembly 40 as shown in FIG. 2, the lead screw 38 being driven by a motor and gearbox assembly 42 and the lead screw 36 being driven by a motor and gearbox assembly 44 housed within the housing indicated generally by the reference character 46.

The carriage 24 carries the housing 48 containing the drive motor 50 for the spindle 52, the spindle 52 carrying a suitable chuck 54 for receiving a drill or milling cutter.

The console 12 includes the tape unit 56 which is provided with a slot 58 for receiving the control tape as hereinafter described. Within the unit 56 there is provided a tape drive unit consisting essentially of a pair of pinch rolls which are driven at a constant speed so as to impart a predetermined linear or longitudinal rate of feed of the tape which, as hereinafter described, bears a fixed relation to the rate of movements of the various elements of the machine 10. The tape head also includes a switch 60 to start and stop the tape drive.

The lower portion of the console 12 houses the electric controls and includes a front panel 62 having an on off switch 64 and an associated light 66 to indicate when power is up and also includes the six lights 68, 70, 72, 74, 76 and 78. These lights are associated with the tape drive and tape reader unit in the housing 56 to indicate which directions of motion are being effected to the machine 10. For example, if one considers the X axis as being the cross feed axis defined along the ways 28, the Y axis as that axis back and forth along the ways 18 and the Z axis as the carriage movement up and down along the ways 20; and with the positive and negative X axis movements respectively as right and left movements of the table 26, the positive and negative Y axis movements respectively as in and out movements of the platform 22, and positive and negative Z axis movements respectively as up and down movements of the carriage 24, the respective lights or indicators 68, 70 and 72 may correspond to positive X, Y and Z axis movements while the respective indicators 74, 76 and 78 indicate corresponding −X, −Y and −Z movements.

Figure 3:
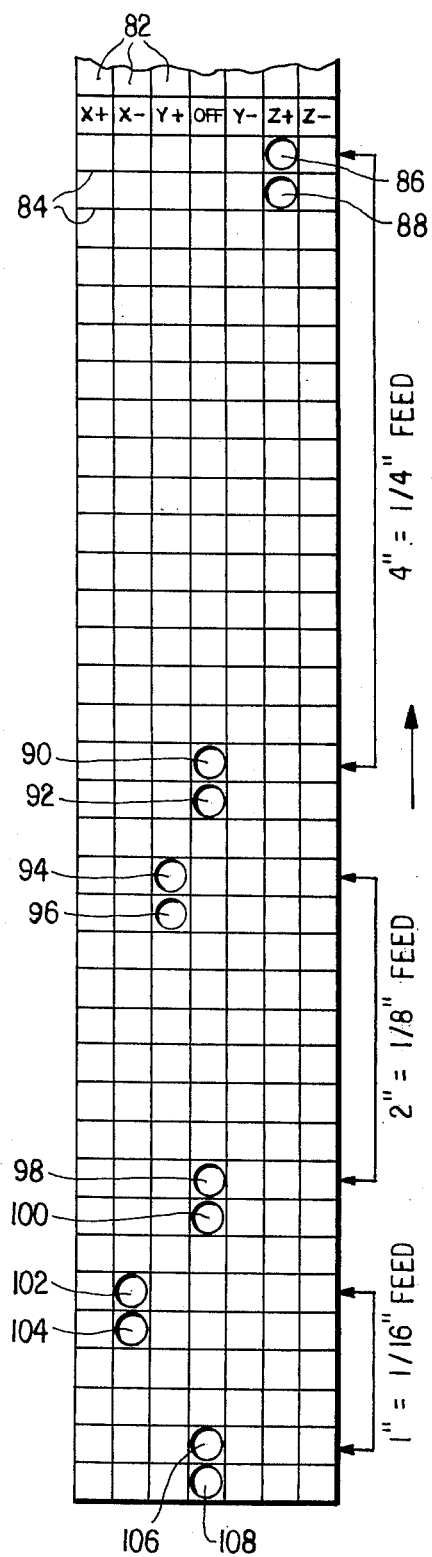
FIGS. 3–5 are views illustrating the principles of the invention in association with programmed tapes.
Figure 4:
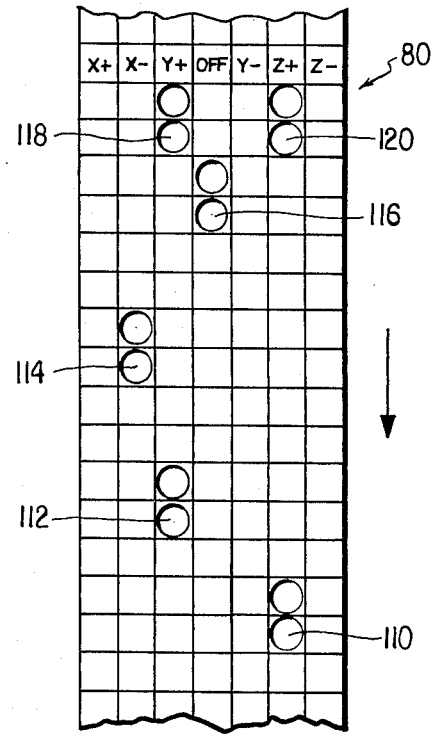
Figure 5:
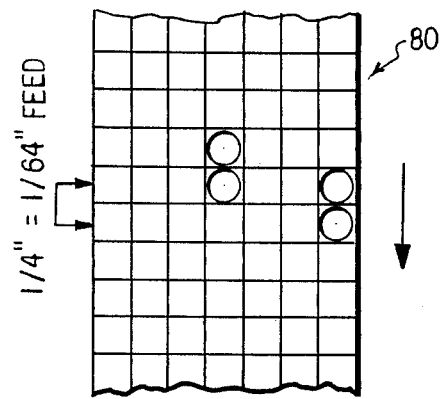

With reference now more particularly to FIGS. 3–5 inclusive, the control tape is indicated by the reference-character 80 therein and will be seen to be of generally graph - type paper form having the six longitudinally extending markings 82 and the equidistantly spaced transverse marking 84. As noted earlier, each of the X, Y and Z axis drives are effected at a predetermined rate of movement and the control tape drive effects a corresponding greater rate of movement of the tape. In the particular instance shown in the drawings, the tape is driven at a linear speed sixteen times greater than the linear speed of movement along any of the axes so that, as is indicated in FIG. 3 for example, 4 inches of tape correspond to 1/4 inch of machine feed. As indicated, the seven channels delineated by the longitudinal markings 82 correspond to X+ Y− Y+ off Y− Z+ and Z−.

The tape shown in FIG. 3 illustrates point-to-point control. The transverse markings 84 are so spaced that each, in this specific embodiment, corresponds to one sixty-fourth inch movement along the machine axis. The two holes 86 and 88 are punched in the Z+ channel as shown and for a one-fourth inch feed along this corresponding axis, the termination of the feed is acheived in the "off" channel by punching the hole 90 four inches from the hole 86. The use of the two extra holes 88 and 92 for safety purposes to assure positively that starting and stopping occurs. Next, movement along the Y+ direction is desired so the holes 94 and 96 are punched and then this motion is terminated after 2 inches of movement by punching the holes 98 and 100. Next, X− movement is desired and the holes 102 and 104 are punched and since in the indicated example only one-sixteenth inch feed is desired, the hole 106 is punched at a 1 inch interval from the hole 102, the additional hole 108 also being punched as previously described.

FIGS. 4 and 5 illustrate continuous path numerical control. In FIG. 4, the hole 110 is punched to initiate Z+ movement and then one-sixteenth inch movement of the machine later the hole 112 initiates movement in the Y+ direction and then 1 inch later of tape movement corresponding to one-sixteenth of an inch machine feed the hole 114 is punched to initiate movement in the X− direction. The next sequence which occurs is that the hole 116 is punched which terminates movement along all of the channels or axes. Thus, with the program of holes 110, 112, 114 and 116, the machine moves a total of eleven-sixteenth's in the Z+ direction, one-eighth of an inch in the Y+ direction and one-fifteenth of an inch in the X− direction.

The sequence of operation is effected by the two holes 118 and 120 which simultaneously initiate movement in the Y+ and Z+ directions and this of course can be terminated later or an X axis direction may later be picked up simultaneously before all movements are terminated by a hole in the "off" channel.

FIG. 5 illustrates the smallest increment of feed which can be effected by punching the tape.

Figure 6:
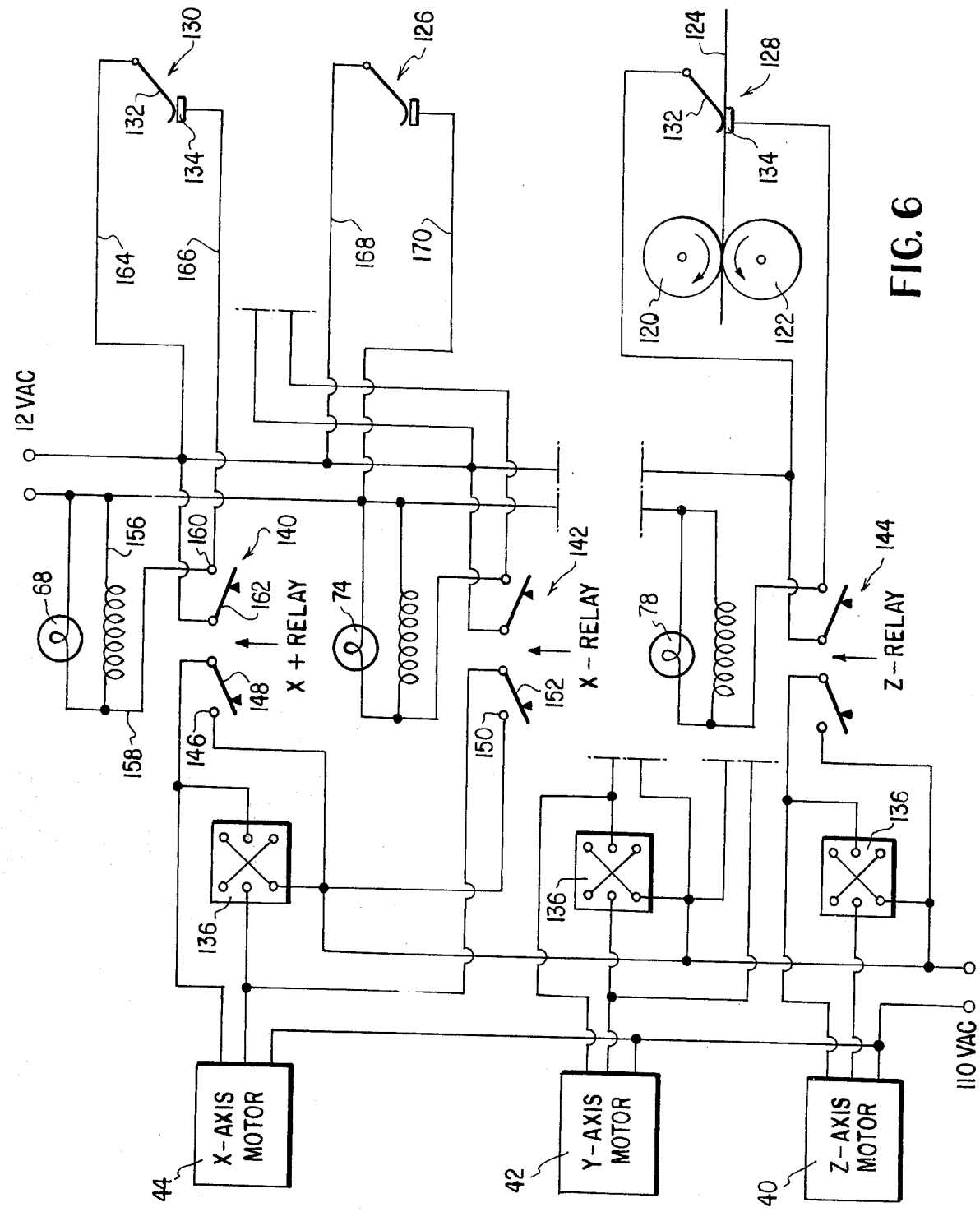
FIG. 6 is a diagrammatic view illustrating the electrical portion of the system.

Referring to FIG. 6, the tape feed and hole sensors can be seen therein. The tape feed simply comprises a pair of pinch rolls 120, 122 driven by a suitable motor and having such diameters as to impart a linear speed to the tape 124 which bears a fixed relation to the X, Y and Z axis feed rates. As noted, the tape preferably is driven at a speed sixteen times faster than the axes feed rate.

There are seven hole sensors associated with the tape feed device, two for each axis and the "off" sensor 126. In FIG. 6, the Z-sensor 128 is shwon in proper relation to the tape 124 whereas the "off" sensor 126 and the X+ sensor 130, also shown in FIG. 6, are vertically spaced above the sensor 128 for purpose of clarity. It will be understood that these sensors are disposed in side-by-side relation and each includes a springbiased contact finger 132 engaging the top surface of the tape 124 and an underlying contact strip 134 whereby each sensor acts as a switch to sense a tape hole in its associated tape channel.

The motors 40, 42 and 44 are of the reversible type and assocated with each is a forward/off/reverse switch 136 whereby the machine tool may be manually controlled either independently of the tape control or to override it. There is a total of six double pole, double throw relays, one associated with each drive direction of the three axes or, in other words, two for each motor 40, 42 and 44. The X+, X− and Z− relays 140, 142 and 144 only are shown in FIG. 6 but it will be understood that all relays are wired identically.

The contacts 146 and 148 of the relay 140 are connected to energize the motor 44 in one direction whereas the identical contacts 150 and 152 of the relay 142 are connected to energize the motor 44 in the opposite direction. A similar situation prevails for the two relays associated with each of the motors 40 and 42.

A low voltage source is used to energize the winding 154 of each relay, each such winding being connected at one end through a conductor 156 to this source. The opposite end of each winding is connected by a jumper 158 to the fixed contact 160 and the associated movable contact 162 is connected by the conductor 164 to the associated sensor finger, in this case the sensor finger 132. The sensor contact 134 is connected by the conductor 166 to the fixed contact 160. Thus, if the tape contains a hole in the X+ channel, the contacts 132, 134 of the sensor 130 will make electrical contact to energize the winding 154 of the relay 140 over the conductor 164, sensor 130, conductor 166, jumper 158, and through winding 154 and the conductor 156 back to the other side of the low voltage source. As soon as the relay is energized, it will be latched because of the holding path established through the contacts 160, 162.

The "off" sensor 126 which is associated with the "off" channel of the tape, is connected to short across the holding circuit of all relays, thereby to deenergize all of them. This is accomplished by connecting the contacts of the sensor 126 through the respective conductors 168 and 170 to establish a short circuit directly across the low voltage supply.

The use of six relays, interconnected as shown with seven sensor devices, renders the system exceedingly economical and provides wholly effective operation with minimum of complexity. An important advantage resides in the fact that only seven sensor channels are required, thus allowing the control tape to be relatively narrow.

Although this Numerical Control System is primarily designed for instructional purposes, it could also be utilized for industrial production machine tools, where speed, accuracy, variable feed rates, and other advantages of true and complex numerical control systems are of minor importance.

What is claimed is:

1. An educational device for training persons in the principles of numerical control, comprising in combination:

a machine tool assembly comprising a tool and a workpiece holder and drive means for effecting relative movements between the tool and the workpiece holder back and forth along at least two mutually orthogonal axes and at a predetermined rate of relative movement, said drive means comprising a first motor associated with one axis, a second motor associated with the other axis, a source of electrical power, a first relay having a pair of normally open contacts for connecting said first motor to said source, and a second relay having a pair of normally open contacts for connecting said second motor to said source, each relay having a winding; and control means for energizing each motor in programmed fashion to obtain desired relative movements along said axes, said control means comprising a tape feed means for feeding a control tape at a predetermined feed rate bearing a fixed relation to said predetermined rate of relative movement effected by said drive means, sensor means for sensing control indicia to energize and deenergize said drive means, said sensor means including a second source of electrical power, a first pair of sensor contacts for connecting the winding of said first relay to said second source, a second pair of sensor contacts for connecting the winding of said second relay to said second source, and a third pair of sensor contacts for shorting across said second source to terminate any energization of the winding of either of said first and second relays, and a control tape having control indicia spaced longitudinally thereon which selectively close said pairs of sensor contacts.

2. An educational device as defined in claim 1 wherein there are three orthogonal axes, said drive means including a third motor associated with the third axis, a third relay having a pair of normally open contacts for connecting said third motor to said source, and there being three additional relays, one for each motor, having respective pairs of normally open contacts for connecting said respective motor to said source to drive such motors in the opposite direction from that attained by closing the respective first, second and third normally open contacts, said sensor means having fourth, fifth, sixth and seventh pairs of sensor contacts for respectively connecting the winding of said third and said three additional relays to said second source, and said tape has seven channels cooperative with the seven sensor contacts of said sensor means, two for starting the movements back and forth along each axis and one associated with said third pair of sensor contacts for stopping movements initiated by the other six channels.

3. An educational device as defined in claim 1 wherein said control tape is provided with transverse markings deliniating successive longitudinal spaces for receiving said control indicia, said markings being spaced such that each space corresponds to a selected axial feed movement.

4. An educational device as defined in claim 2 wherein said control tape is provided with longitudinal markings dividing same into seven longitudinal areas and being provided with transverse markings delineating longitudinal spaces for receiving said control indicia, said transverse markings being spaced such that each space corresponds to a selected axial feed movement.

5. An educational device for training persons in the principles of numerical control, comprising in combination:

a machine tool assembly comprising a tool and a workpiece holder, a first drive means including a first reversible motor for effecting relative movement between the tool and holder back and forth along a first axis, and a second drive means including a second reversible motor for effecting relative movement between the tool and holder back and forth along a second axis which is orthogonal to the first axis, there being a common source of electrical power for said first and second drive means, said first drive means also including a first relay having a first pair of normally open contacts for connecting said first motor to said source to drive such first motor in one direction and a second relay having a second pair of normally open contacts for connecting said first motor to said source to drive such first motor in the opposite direction, said second drive means also including a third relay having a third pair of normally open contacts for connecting the second motor to the source to drive such second motor in one direction and a fourth relay having a fourth pair of normally open contacts for connecting the second motor to the source to drive such second motor in the opposite direction, each of said relays having a winding and each having a pair of normally open latching contacts; and control means for energizing said motors in programmed fashion to obtain desired relative movements along said axes, said control means comprising a source of low voltage electrical power, a set of five normally open, side-by-side sensor contacts, a punched tape, punched tape drive means for feeding said punched tape between said set of sensor contacts at a linear speed which is a large multiple of the linear speed at which said motors impart said relative movements, said set of five sensor contacts comprising first, second, third and fourth pairs of contacts respectively connecting said low voltage source to the windings of said first, second, third and fourth relays whereby a punched opening in said tape allowing any pair of said sensor contacts momentarily to close will latch the corresponding relay, and the fifth pair of sensor contacts being connected across said low voltage source whereby a punched opening in said tape allowing said fifth pair of sensor contacts momentarily to close will deenergize any relay which has been latched.

* * * * *

UNITED STATES PATENT AND TRADEMARK OFFICE
CERTIFICATE OF CORRECTION

PATENT NO. : 3,991,652
DATED : November 16, 1976
INVENTOR(S) : Anthony W. Fini, Jr.

It is certified that error appears in the above—identified patent and that said Letters Patent are hereby corrected as shown below:

Col. 1, Line 22 - "as" should be --- at ---.

Col. 3, Line 53 - eleven-sixteenth's" should be --- eleven-sixty fourth's ---.

Col. 4, Line 6 - "shwon" should be --- shown ---.

Signed and Sealed this

Twenty-second Day of February 1977

[SEAL]

Attest:

RUTH C. MASON
Attesting Officer

C. MARSHALL DANN
Commissioner of Patents and Trademarks